(12) United States Patent
Lambert et al.

(10) Patent No.: US 7,648,115 B2
(45) Date of Patent: Jan. 19, 2010

(54) SEAT SLIDE LOCATOR

(75) Inventors: John Paul Lambert, Franksville, WI (US); John Lee Thompson, Sun Prairie, WI (US); Brian David Seegert, Hartford, WI (US)

(73) Assignee: Deere & Company, Moline, IL (US)

( * ) Notice: Subject to any disclaimer, the term of this patent is extended or adjusted under 35 U.S.C. 154(b) by 450 days.

(21) Appl. No.: 11/471,196

(22) Filed: Jun. 20, 2006

(65) Prior Publication Data

US 2007/0290116 A1   Dec. 20, 2007

(51) Int. Cl.
 *F16M 13/00* (2006.01)
(52) U.S. Cl. .................. 248/429; 244/131; 297/344.1
(58) Field of Classification Search .............. 297/344.1, 297/440.22; 244/118.5, 118.6, 131; 248/429, 248/424
See application file for complete search history.

(56) References Cited

U.S. PATENT DOCUMENTS

| | | | | |
|---|---|---|---|---|
| 5,520,357 A | * | 5/1996 | Payne et al. ............. | 244/118.1 |
| 6,010,194 A | * | 1/2000 | Cykon ................... | 297/440.22 |
| 6,176,460 B1 | * | 1/2001 | Kojima et al. .............. | 248/429 |
| 6,260,813 B1 | * | 7/2001 | Whitcomb ............... | 248/503.1 |
| 6,712,316 B2 | * | 3/2004 | Jones ......................... | 244/132 |
| 6,799,803 B1 | * | 10/2004 | Lee et al. ............... | 297/411.35 |
| 6,945,505 B2 | | 9/2005 | Hohnl et al. ................ | 248/424 |
| 7,328,877 B2 | * | 2/2008 | Yamada et al. ............. | 248/430 |
| 7,334,758 B2 | * | 2/2008 | Williamson et al. ....... | 244/118.6 |
| 7,410,127 B1 | * | 8/2008 | Ahad ...................... | 244/118.5 |

* cited by examiner

*Primary Examiner*—Ramon O Ramirez
*Assistant Examiner*—Bradley H Duckworth

(57) ABSTRACT

The present invention relates to a seat slide locator for a seat mount assembly on a tractor, riding mower, or off-road utility vehicle. The seat slide locator has a first end, a second end, and a raised portion dimensioned to slidingly fit in a guide slot in the seat support. Each end has an aperture through which the seat securing member may be inserted. The seat slide locator provides a simple, economical component that helps maintain the seat securing members properly aligned and positioned so that the assembly can slide within the guide slot as the seat position is manually adjusted.

20 Claims, 4 Drawing Sheets

SEAT SLIDE LOCATOR

FIELD OF THE INVENTION

The present invention generally relates to seat mount assemblies for tractors, riding mowers and off-road utility vehicles which enable users to adjust the seat position. More specifically, the invention relates to a seat slide locator for use with an adjustable seat assembly for such vehicles.

BACKGROUND OF THE INVENTION

Tractors, riding mowers and off-road utility vehicles may include an adjustable seat to accommodate the different sizes and needs of users. Some known seats require the user to get off of the seat in order to adjust the seat. Once off of the seat, the user must turn knobs or use tools in order to adjust the seat position. A significant disadvantage with these seats is inconvenience.

Other known seats are adjustable while the user remains on the seat. Adjustment mechanisms for these types of seats are relatively complex, and include a relatively high number of parts, such as wireforms, coil springs, rails and/or ball bearings. Due to this complexity, these seat adjustment mechanisms have several disadvantages. They malfunction relatively frequently, require a relatively high amount of maintenance services and are relatively expensive to manufacture.

U.S. Pat. No. 6,945,505 relates to a seat mount assembly for a tractor which enables users to adjust the seat position while remaining seated. The seat mount assembly includes a seat mount or seat support which provides support for the seat, a plurality of seat securing members which connect the seat to the seat support in a slidable fashion, and a unitary springback seat adjust handle connected to the seat which removeably engages the seat support.

The seat mount assembly described above provides an easily adjustable seat system that can be economically manufactured, and can accommodate more than one seat size, but it is desirable to further improve the assembly. For example, it is desirable to reduce or eliminate seat play in the seat slide mechanism. Seat play may result if the seat securing members are not sufficiently tight, or if the assembly is subject to normal wear and tear as it is adjusted over the course of time. Additionally, it is desirable to reduce or minimize labor time and cost to manufacture the seat mount assembly, including manufacturing labor to assemble the components of the seat mount assembly together.

SUMMARY OF THE INVENTION

The present invention provides a seat slide locator that addresses the problem of seat play in the seat slide mechanism, and reduces labor time and cost to manufacture the seat mount assembly. The seat slide locator includes a pair of apertures that provide center-to-center positions for a pair of seat securing members. The seat slide locator may be configured to fit more than one center-to-center location of seat securing members.

In one embodiment, the seat slide locator includes a pair of plastic pieces that snap together and fit within a slot in the seat mount assembly. The seat slide locator also may improve the reliability of seat adjustment devices for tractors, riding mowers, and off-road utility vehicles, and help decrease maintenance required by seat adjustment devices.

Additional features and advantages of the present invention are described in, and will be apparent from, the following detailed description of a preferred embodiment and the figures.

DETAILED DESCRIPTION OF A PREFERRED EMBODIMENT

Figure 1:
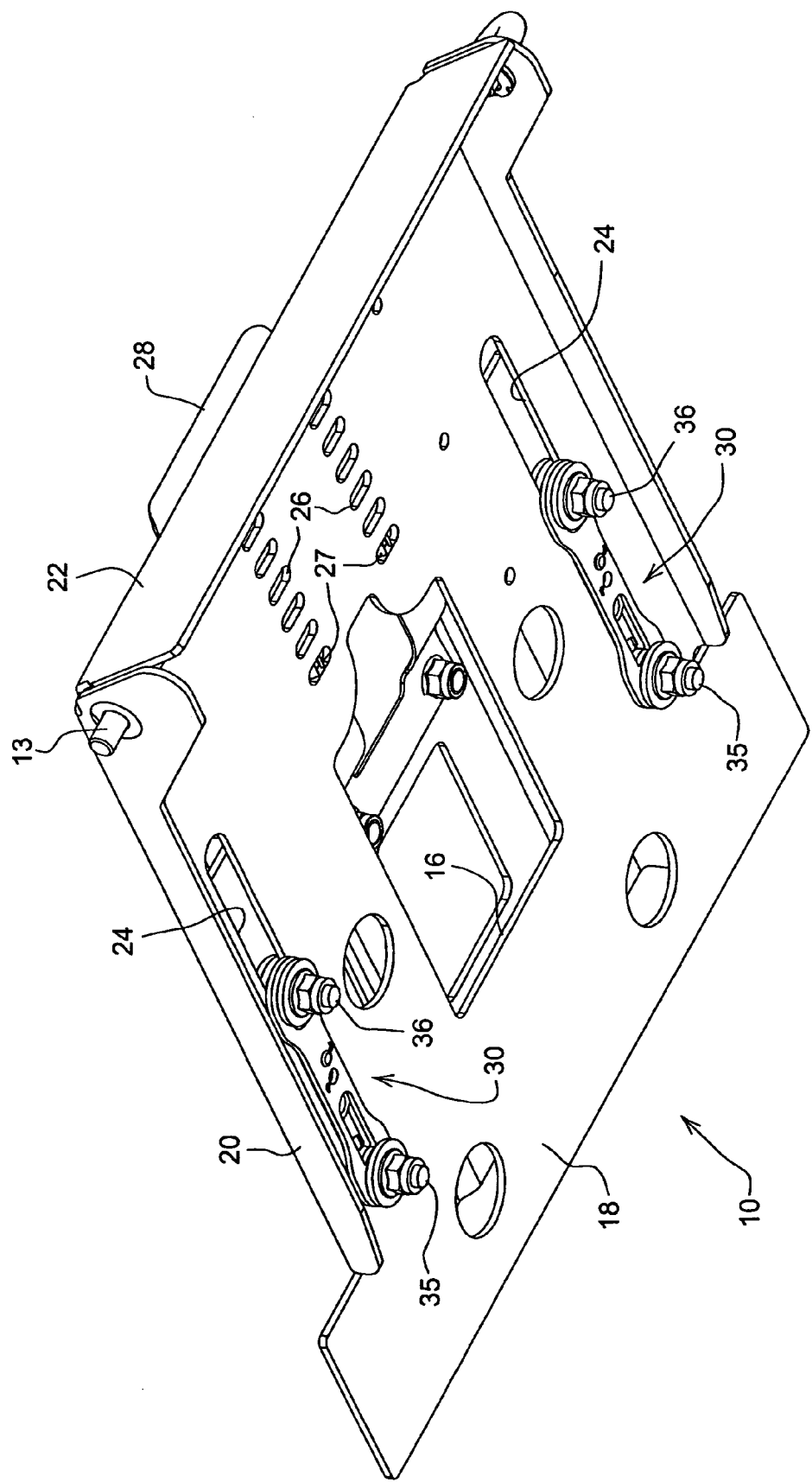
FIG. 1 is a bottom perspective view of a seat support with a pair of seat slide locators in one embodiment of the present invention.

Referring now to the drawings, FIGS. 1-4 show seat support 10 which may connect seat 12 to the frame 14 or body of a tractor, riding lawn mower, or off-road utility vehicle. The seat support may be connected to the vehicle frame 14 in any suitable fashion, and preferably may be pivotally connected to the frame at a pivot axis 13 at or near the forward end of the seat support. For example, the seat may pivot forward manually when not occupied, and also may pivot forward automatically absent the weight of a seated operator to activate a switch and/or circuit that terminates one or more vehicle functions.

In one embodiment, the seat support may be a sheet metal component having a generally horizontal or flat top panel 18, downwardly depending side edges 20, and a downwardly depending front edge 22. The seat support also may have a seat access opening 16 which may provide access to connect electrical wires to seat 12 for an operator presence switch or for any other seat installation purpose. The seat support may be formed of a suitable metallic material, such as sheet metal, and may have any suitable configuration, such as a pan-shaped or polygon-shaped configuration.

In one embodiment, the horizontal or flat top panel of the seat support may have a plurality, and preferably two, guide slots 24 which define the sliding movement of seat securing members 35, 36. Each guide slot 24 may define an opening with a longitudinal axis aligned parallel with the longitudinal axis of the vehicle. Optionally, the seat support also may have one or more reinforcement or stiffening members (not shown).

In one embodiment, the seat assembly also may include one or more, and preferably a plurality of engaging slots 26 which engage with seat support engaging member(s) 27. The engaging slots 26 may be positioned on seat support 18 near a side edge, or may be positioned at or near the front and center of the seat support. It is preferable that engaging slots 26 are arranged in a uniformly spaced, sequential array. For example, engaging slots 26 may be arranged in one or more lines, and each engaging member or slot may be separated from the adjacent engaging member or slot by substantially the same distance.

In one embodiment, at least one, and preferably two or more seat support engaging members 27 may be attached or released from engaging slots 26 using seat adjust handle 28. The seat adjust handle may be a one-piece or unitary flexible metallic strip, including a hand grip member which enables the user to grip the seat adjust handle, a body connected to the hand grip member, and a seat securing member which connects the seat adjust handle to the seat. The body includes at least one and preferably a plurality of seat support engaging members 27 which extend into and mate with engaging slots 26. Seat support engaging members 27 restrain the sliding movement of seat 12 relative to seat support 18. It is preferable that each seat support engaging member 27 includes at least one tooth or male member which extends into an engaging slot 26 to lock seat 12 in a fixed position.

Figure 4:
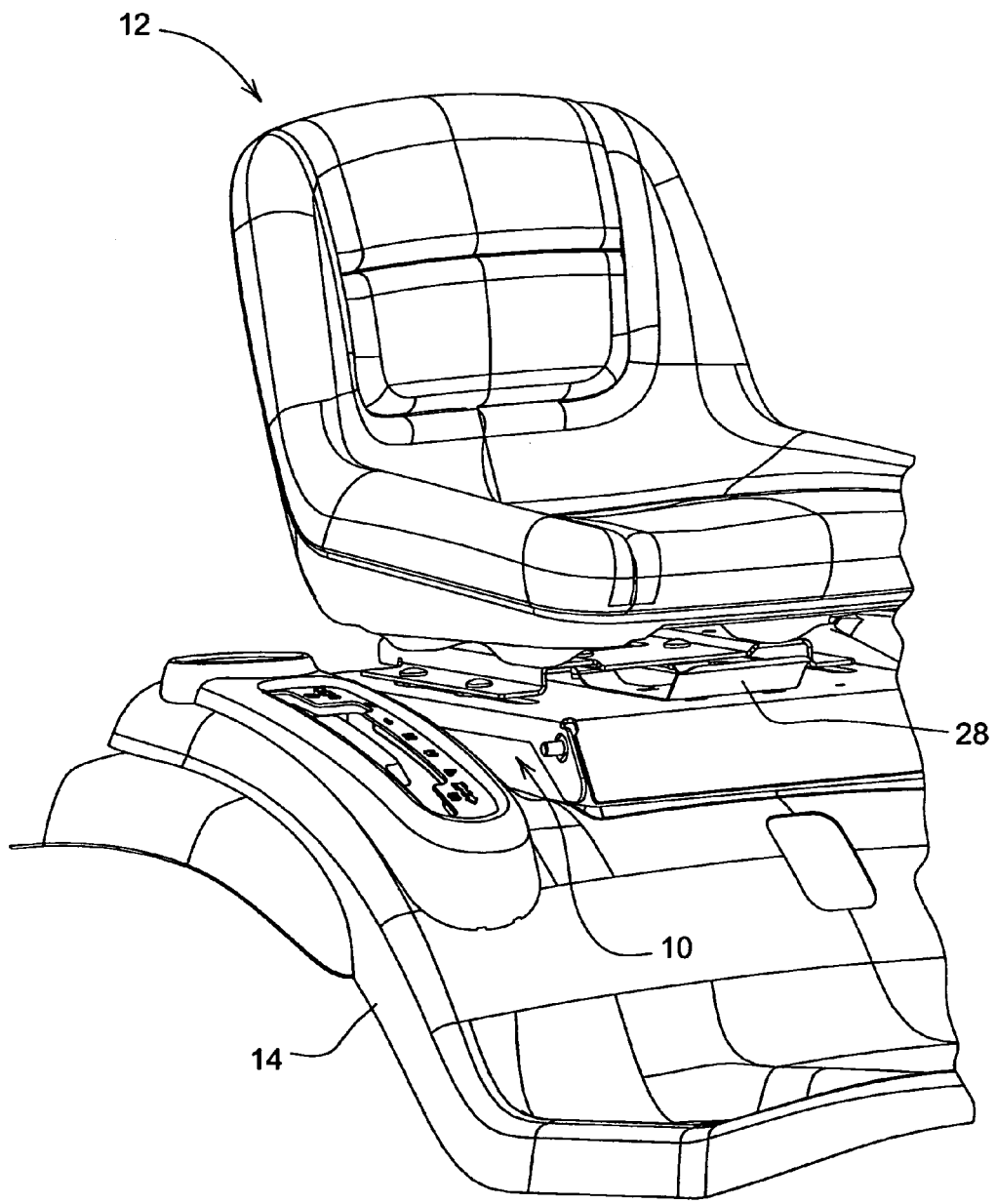
FIG. 4 is a side perspective view of a seat for a tractor or riding mower with a seat mount assembly according to one embodiment of the present invention.

In one embodiment, the seat adjust handle may be at or near the front and center of the seat as shown in FIGS. 1 and 4, or alternatively may be on the right hand side or left hand side of seat support 18. The position of the seat adjust handle may facilitate a user's convenient access and operation of the seat adjust handle. The seat adjust handle is easy to reach because it moves fore and aft along with the seat when it is adjusted to any position. Seat adjust handle 28 may be constructed of a flexible material which, when flexed and released, returns to its original shape or substantially original shape. In operation, seat adjust handle 28 has an engaged position when in contact with seat support 18. A user may pull the seat adjust handle upward to a disengaged position and slide seat 12 forward or backward. Once the user reaches the desired seat position, the user can release the seat adjust handle. Upon release, the seat adjust handle returns to the engaged position, and the seat support engaging members 27 extend into and engage with engaging slots 26. At this point, seat adjust handle 28 locks seat 12 in place.

In one embodiment, seat adjust handle 28 may be constructed of a metallic material, but also can be constructed of other suitable materials such as any suitable plastic, rubber or any suitable combination of metal, plastic, rubber or any other material. The metallic material preferably has springback properties suitable for undergoing repeated deformation of the seat adjust handle due to the user's upward pulling and releasing of the hand grip. Metallic material also has a suitable strength so that the mating members on the seat adjust handle and engaging slots, though relatively small in size, have sufficient strength to restrain the forward and backward movement of the seat during the operation of the vehicle.

Each seat mount assembly includes at least one pair of seat securing members 35, 36 that connect a seat to guide slots 24. Each seat securing member 35, 36 may include any suitable member or fastener either directly connected to seat 12 or connected to a seat adaptor plate 40 attached to the bottom of a seat. Preferably, each of seat securing members 35, 36 includes a bolt, bushing 34 and nut 41 or similar threaded fastener. It should also be appreciated that, instead of including separable seat securing members, the seat securing members can be incorporated into a seat frame which supports the seat cushion. For example, the seat frame can include one or more studs, rigidly connected to the seat frame, which slidably engage with the seat support.

In one embodiment, each guide slot 24 may be provided with a seat slide locator 30 through which a pair of seat securing members may be inserted and positioned. The seat slide locator may be provided to slide along each of the guide slots on the left and right sides of the seat support. Each seat slide locator may be a light weight plastic component that slides along the guide slot and controls the relationship and position of the pair of securing members that slide within the guide slot.

In one embodiment, seat slide locator 30 may be a two-piece component, with an upper part 30a and a lower part 30b. Preferably, the upper and lower parts are identical or substantially the same, so that either part may be used as the upper or lower part. The upper and lower parts may be assembled together during manufacture of the seat mount assembly. After the upper and lower parts are assembled together, both parts of the seat slide locator can slide together along the guide slot as the seat is adjusted. For example, the guide slot may be sandwiched between the upper and lower parts of the seat slide locator, reducing or eliminating free play as a result of tolerance stack up. The upper and lower parts may snap together which allows the seat mount assembly to be assembled easily and manipulated without multiple parts during assembly, reducing manufacturing labor for the seat slide assembly.

In one embodiment, upper and lower parts 30a, 30b of seat slide locator 30 may be identical, and each may include a first end 37 with aperture 42 therethrough, a second end 39 with aperture 46 therethrough, and a neck 44 between the two ends. Additionally, each part 30a, 30b of the seat slide locator may include a raised portion 45 at or adjacent the first end that is dimensioned to slidingly fit within guide slot 24. The raised portion may have a length of preferably at least about one inch but less than the length of the guide slot, a width that is the same or slightly less than the width of the guide slot, and a thickness that is substantially the same or slightly more than the thickness of the guide slot. As a result, the raised portion of the seat slide locator fits within the guide slot and helps maintain the seat slide locator in the correct longitudinal front-to-back orientation in the guide slot. In one embodiment, the raised portion of each part may have a width substantially the same as the neck 44 of the seat slide locator. The ends of each part of the seat slide locator may be wider than the guide slot, to extend over the guide slot and hold the seat slide locator in the slot after the two parts are assembled together.

In one embodiment, each seat securing member 35, 36 may be inserted through a pair of apertures in the end of the seat slide locator, including an aperture in the upper part and an aperture in the lower part. Once each seat securing member is inserted through a pair of apertures, the seat slide locator provides stiffness and rigidity to maintain the desired spacing and alignment between the pair of securing members.

Figure 2:
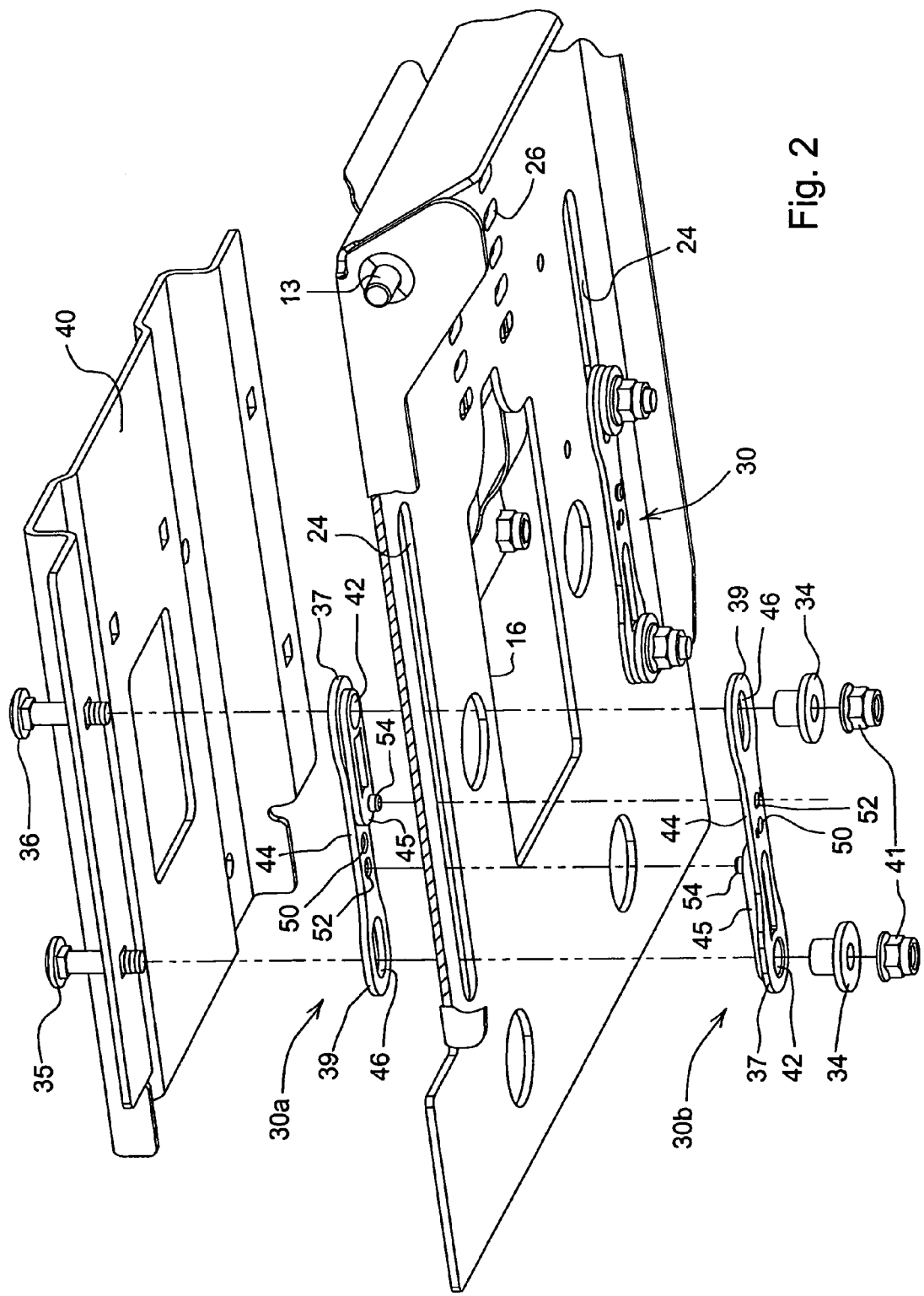
FIG. 2 is a partially exploded side perspective view of a seat support with a pair of seat slide locators positioned in a first or maximum center-to-center location of seat securing members, according to a first embodiment of the present invention.
Figure 3:
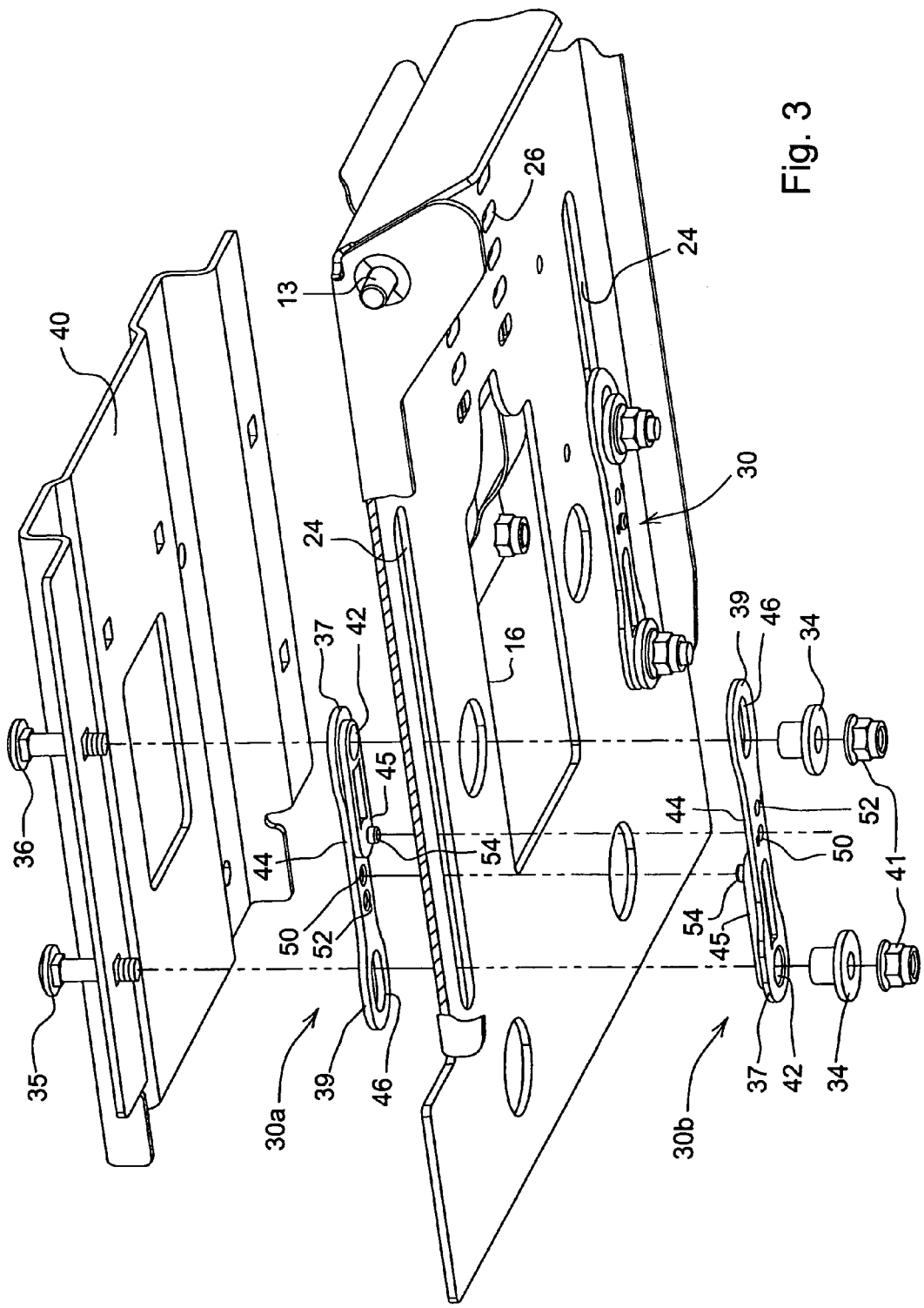
FIG. 3 is a partially exploded side perspective view of a seat support with a pair of seat slide locators positioned in a second or minimum center-to-center location of seat securing members, according to a first embodiment of the present invention.

In one embodiment, the upper and lower parts of the seat slide locator may be attached together so that the apertures in the upper and lower parts are aligned. As shown in the embodiment of FIGS. 2 and 3, seat securing member 35 may be inserted through an opening in seat adaptor plate 40, and through aperture 46 in the second end 39 of upper part 30a, guide slot 24, aperture 42 in the first end 37 of lower part 30b, bushing 34, and secured with nut 41. Seat securing member 36 may be inserted through an opening in seat adaptor plate 40, and through aperture 42 in the first end 37 of upper part 30a, guide slot 24, aperture 46 in the second end 39 of lower part 30b, bushing 34, and secured with nut 41. Optionally, seat adjust handle 28 also may be connected to seat slide locator 30 so that it slides in unison with the seat slide locator. This may be done by connecting seat securing members 35, 36 through holes in the seat adjust handle in addition to the other components described above.

In one embodiment, upper and lower parts 30a, 30b of seat slide locator 30 may be removably assembled or attached together in at least two different positions to provide at least two different center-to-center dimensions between the pair of apertures. By providing at least two different center-to-center dimensions between the pair of apertures, the seat slide locator may be used for seats and/or adaptor plates having different center-to-center dimensions between their seat securing members. For example, the upper and lower parts 30a, 30b of the seat slide locator may provide either a first, maximum center-to-center dimension for a pair of seat securing members 35, 36, or a second, minimum center-to-center dimension for the pair of seat securing members.

In one embodiment, the seat slide locator may provide alternative center-to-center dimensions, by removably inserting post 54 through either of holes 50 or 52 in the opposing member. Each part 30a, 30b may have a post 54 extending from the raised portion, which is dimensioned to fit into either of holes 50, 52 in the opposing part of the seat slide locator. For example, as shown in FIG. 2, post 54 may be removably inserted into hole 52 in the opposing part to provide a first, maximum center-to-center dimension between the pair of apertures. In FIG. 2, the center-to-center dimension is 4 inches between the pair of apertures. FIG. 3 shows each post 54 removably inserted into hole 50 in the opposing part to provide a second, minimum center-to-center dimension between the pair of apertures. In FIG. 3, the center-to-center dimension is 3½ inches between the pair of apertures. Optionally, the seat slide locator can provide more than two alternative center-to-center dimensions. The upper and lower parts are held together by removably inserting post 54 into one of holes 50, 52 in the opposing part, to provide a snap fit, and so that the guide slot may be sandwiched between the upper and lower parts. Additionally, the spacing between the upper and lower parts of seat slide locator 30 may be varied to accommodate seat supports with different thicknesses. For example, the upper and lower parts may be held closer together if seat support 10 has lower thickness, by inserting post 54 further into the selected hole in the opposing part of the seat slide locator.

Additionally, in one embodiment, one of the apertures in the end of the each part 30a, 30b of the seat slide locator may be generally oblong in shape. For example, aperture 46 may be oblong in shape. The oblong aperture may be dimensioned so that it may be aligned with round aperture 42 in the opposing member at a maximum center-to-center dimension or a minimum center-to-center dimension. The oblong aperture in one end of each part provides two or more different center-to-center dimensions of the seat slide locator.

The seat slide locator of the present invention provides a simple, economical component that helps maintain seat securing members 35, 36 properly aligned and positioned so that the assembly can slide within the guide slot 24 as the seat position is manually adjusted. Additionally, the seat slide locator provides a friction reducing component that straddles the guide slot and improve the sliding operation of the seat slide assembly. The seat slide locator also helps simplify assembly.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A seat slide locator for a seat mounted on a seat support having seat securing members extending through guide slots in the seat support, comprising:
an upper part removably attached to a lower part; each of the upper and lower parts having a first end and a second end, the first and second ends of the upper part being wider than the guide slot and positioned over the guide slot and the upper part having a raised portion slidingly fit in the guide slot; the first and second ends of the lower part being wider then the guide slot and positioned under the guide slot and the lower part having a raised portion slidingly fit in the guide slot; each end having an aperture through which the seat securing member may be inserted, wherein the upper and lower part and essentially identically shaped.

2. The seat slide locator of claim 1 further comprising a post integrally formed on each part and a hole in the opposing part into which the post is removably inserted.

3. The seat slide locator of claim 2 further comprising a plurality of holes in each part through which the post may be removably inserted.

4. The seat slide locator of claim 1 wherein one of the apertures in the first end is oblong.

5. The seat slide locator of claim 1 wherein the seat slide locator has a neck portion between the first end and second end.

6. A seat slide locator for a seat mounted on a seat support having a pair of seat securing members extending through a guide slot in the seat support, comprising;
a plastic component that sandwiches the guide slot between a first part and a second part and that slides along the guide slot and has a first end that is wider than the guide slot with an aperture through which one seat securing member may be inserted, and a second end that is wider than the guide slot with an aperture through which another seat securing member may be inserted; the seat slide locator providing at least two different center-to-center dimensions between the apertures, and where the first and second parts and essentially identical.

7. The seat slide locator of claim 6 further comprising a raised portion of the seat slide locator that fits within the guide slot.

8. The seat slide locator of claim 6 wherein one of the apertures is oblong in shape.

9. The seat slide locator of claim 6 wherein the first part is removably attached to the second part.

10. The seat slide locator of claim 9 wherein the first part and second part may be removably attached together to provide a plurality of center-to-center dimensions between the apertures.

11. The seat slide locator of claim 9 wherein the first part and the second part each include an integral post and a plurality of holes into which the post on the other part may be removably inserted.

12. The seat slide locator of claim 9 wherein the first part and the second part are identical.

13. A seat slide locator for a pair of seat securing members mounted to a seat slidably mounted on a seat support, comprising;
a plastic component with first and second parts sandwiching a guide slot in the seat support therebetween and a with a pair of apertures through which the seat securing members are inserted to provide a specified center-to-center dimension between the apertures for the seat securing members, the plastic component having ends above and below the guide slot that are wider than the guide slot, and having a raised portion that fits within the guide slot in the seat support, where the first and second parts are essentially identical.

14. The seat slide locator of claim 13 wherein the first part is removably attached to the second part.

15. The seat slide locator of claim 13 wherein the plastic component provides a plurality of center-to-center dimensions between the apertures for the seat securing members.

16. The seat slide locator of claim 14 wherein at least one aperture through each part of the seat slide locator is oblong in shape.

17. The seat slide locator of claim 13 further comprising an adjustment handle with seat support engaging members attached thereto.

18. The seat slide locator of claim 13 further comprising a bushing through each aperture.

19. The seat slide locator of claim 13 wherein a portion of the seat slide locator fits within the guide slot.

20. The seat slide locator of claim 13 wherein the seat securing members extend through the guide slot.

* * * * *